United States Patent [19]

Renk

[11] Patent Number: 4,473,933
[45] Date of Patent: Oct. 2, 1984

[54] BEARING PULLING DEVICE

[76] Inventor: Martin J. Renk, P.O. Box 1121, Winona, Minn. 55987

[21] Appl. No.: 427,002

[22] Filed: Sep. 29, 1982

[51] Int. Cl.³ ............................................. B23P 19/04
[52] U.S. Cl. ..................................................... 29/283
[58] Field of Search ................. 29/283, 363, 265, 266; 279/29; 294/94

[56] References Cited

U.S. PATENT DOCUMENTS

| | | | |
|---|---|---|---|
| 1,492,877 | 5/1924 | Davis | 29/266 |
| 1,790,761 | 2/1931 | Ortolon | 294/94 |
| 2,627,773 | 2/1953 | Barnett | 279/2 R |
| 2,790,246 | 4/1957 | May | 279/2 R |
| 3,492,032 | 1/1970 | Deike | 294/94 |
| 3,999,452 | 12/1976 | Larsen | 279/2 R |
| 4,050,136 | 9/1977 | Shultz | 29/263 |
| 4,057,889 | 11/1977 | Ferguson | 29/266 |
| 4,207,664 | 6/1980 | Zoula | 29/265 |
| 4,245,861 | 1/1981 | Harry et al. | 294/94 |
| 4,339,094 | 7/1982 | Thievessen et al. | 279/2 R |

FOREIGN PATENT DOCUMENTS 1830 of 1914 United Kingdom .................. 29/263

Primary Examiner—Robert C. Watson
Attorney, Agent, or Firm—Alan G. Greenberg

[57] ABSTRACT

This device relates to a bearing pulling device for blind holes comprised of a shaft with a cam secured thereto. The cam operates in a split cylinder, said cylinder being resiliently held together. When said cam is rotated, said cylinder is spread apart, positively engaging an annular flange, which is part of said cylinder, with the inside of the bearing to be removed.

6 Claims, 4 Drawing Figures

U.S. Patent  Oct. 2, 1984  4,473,933
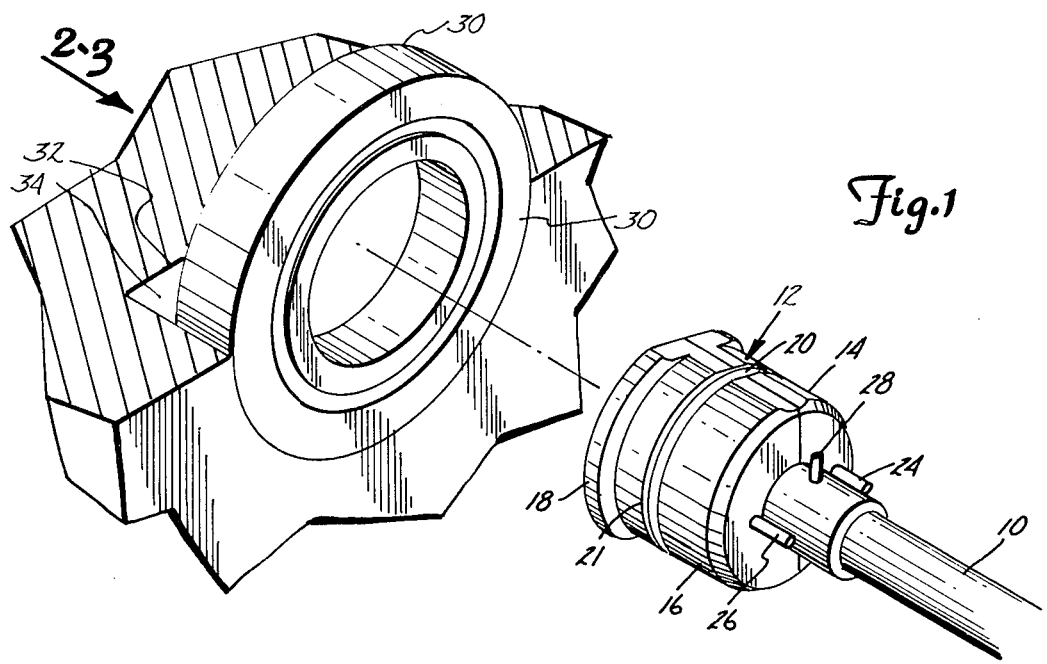
Fig. 1
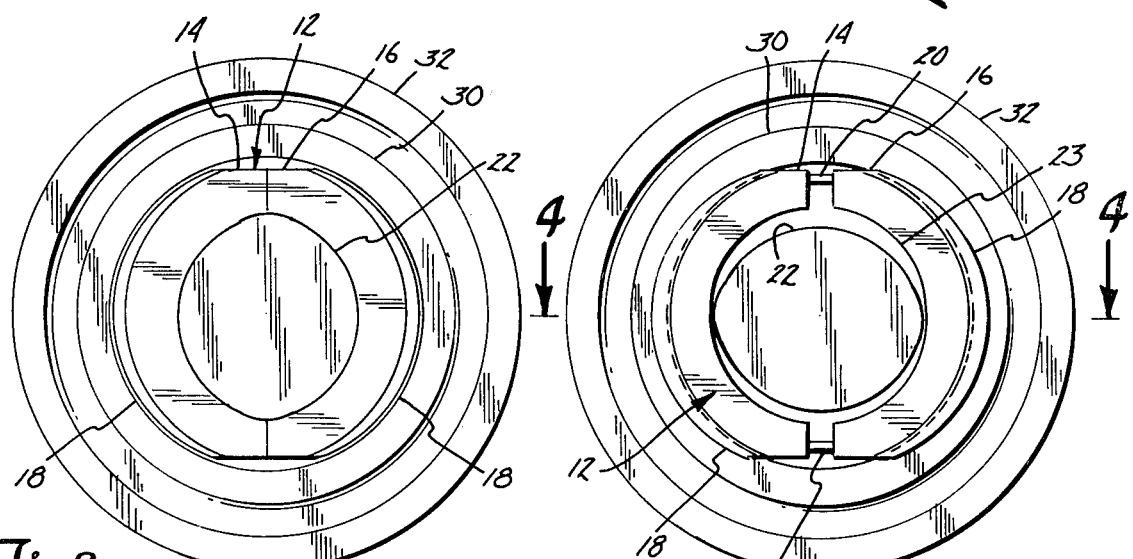
Fig. 2
Fig. 3
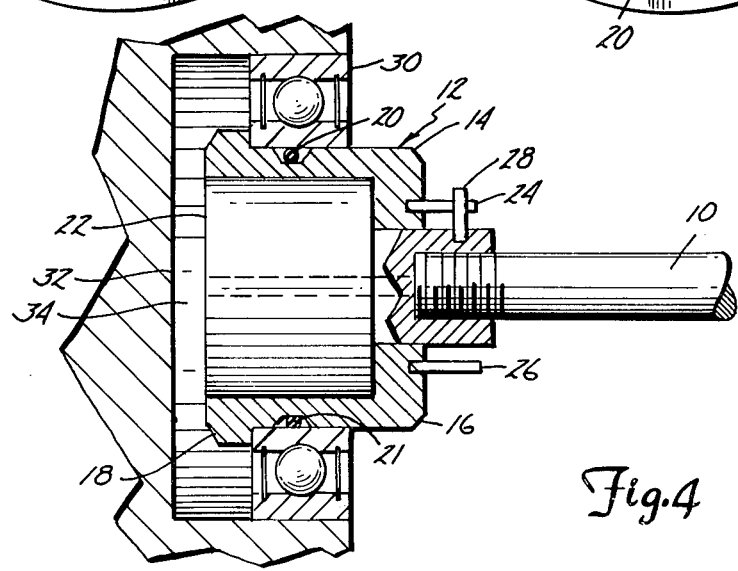
Fig. 4

BEARING PULLING DEVICE

This invention relates to a device for pulling bearings or similar annular rings out of blind holes. Such a device is sorely needed in the heavy equipment field where large bearings must be periodically changed or serviced. To accomplish the changing or servicing, means to remove the bearing must be employed. The problem of removal has been compounded in a situation where the bearing is employed in a blind hole, closed at one end, as is traditionally the case with heavy machinery or trucks.

Devices for pulling bearings out of blind holes have taken the form of spring-like fingers which are used to go through the bearing and then to grip the bearing for removal. These, however, have been too flexible to achieve success.

The device of the present invention teaches a rigid, strong unit which may be inserted through the bearing and then, by rotation of a pulling shaft, goes into positive engagement with the bearing to permit effective removal.

Referring to the drawings:

FIG. 1 is a pictorial view of the device about to be inserted into a blind hole to remove a bearing;

FIG. 2 is an end view of the device along the arrow 2-3 in FIG. 1, and in configuration to pass through the bearing;

FIG. 3 is an end view of the device along and in the direction of arrow 2-3 of FIG. 1 showing the device passed through the bearing and in locked, pulling configuration; and, FIG. 4 is a section view along the line 4-4 and in the direction of the arrows in FIG. 3.

A shaft 10 is provided to maneuver the device. A pulling device member which takes the form of an elongated cylinder 12 is operably secured to said shaft 10. Said elongated cylinder is divided into two sections 14 and 16 along a longitudinal plane through the axis of cylinder 12. Cylinder 12 is provided with a bearing engaging member suitably depicted as annular flange 18. Means are provided to hold said cylinder sections 12 and 16 to shaft and to resiliently bias said cylinder sections 14 and 16 towards said shaft. Such means are adequately depicted by elastic band 20 which is seated in annular groove 21 on the periphery of cylinder 12.

Means for selectively operating or spreading said elongated cylinder sections 14 and 16 are provided. One such means is the elongated cam 22 rigidly secured to shaft 10. Shaft 10 and cam 22 share the same longitudinal axis. Cam 22 is adapted to rotate in cam slot 23 in cylinder 12.

Stop means are provided to prevent rotation of cam 22 beyond ninety (90) degrees. One suitable stop means are shown as pins 24 and 26 in cylinder sections 14 and 16 respectively. A rotating pin 28 or other means for engaging pins 24 and 26 is provided rigidly secured to shaft 10.

A bearing 30 is shown secured in blind hole 32. When bearing 30 is to be removed, the pulling unit is employed by using shaft 10 to guide cylinder 12 through bearing 30. After flange 18 has passed through bearing 30 into space 34, shaft 10 is rotated ninety (90) degrees. It will be appreciated that the rotation of shaft 10 and rigidly secured cam 22 will cause cylinder sections 14 and 16 to spread apart against the resilient biasing of elastic band 20. In such spread apart configuration, it is obvious that annular flange 18 is in firm engagement with bearing 30 facilitating the removal by pulling on shaft 10.

I claim:

1. A pulling device for removing annular rings from a blind hole comprising: a shaft; a pulling member operably secured to said shaft and adapted to selectively engage the ring to be removed from the blind hole, said pulling member comprising an elongated member divided along a longitudinal plane through the longitudinal axis of said elongated member dividing said elongated member into at least two elongated member sections and including an annular flange adapted to selectively engage the ring to be removed from a blind hole, and means for operably securing said elongated member sections to said shaft and biasing said elongated member sections towards said shaft; and, selecting means operably secured to said shaft adapted to selectively engage and release said pulling member from the ring to be removed, said selecting means comprising a longitudinal cam secured to said shaft and adapted to selectively move said elongated member sections apart so as to selectively increase the diameter of said annular flange so as to engage the ring to be removed from the blind hole.

2. The pulling device of claim 1 further characterized by the means for biasing said elongated member sections toward said shaft comprising an elastic ring operably secured to said elongated member in an annular groove on the periphery of said elongated member, said elastic ring adapted to operably secure each of said elongated member sections toward the other.

3. The pulling device of claim 1 further characterized by said enlongated member and said cam including locking means to prevent relative rotation of said cam and said elongated member beyond ninety (90) degrees.

4. A device for pulling bearings from blind holes comprising: A shaft; an elongated means operably secured to said shaft and comprising a cylinder adapted to fit over said shaft, said cylinder being divided along a longitudinal plane through the longitudinal axis of said cylinder into at least two sections, said cylinder including an annular flange adapted to pass through a bearing in a bling hole and selectively engage the bearing, facilitating the removal thereof and, means for selectively operating said elongated means comprising an elongated cam rigidly secured to said shaft and adapted to rotate in a cam slot in said cylinder to selectively move the sections apart.

5. The device of claim 4 further characterized by said section 5 of said cylinder being resiliently biased toward said shaft by an elastic member operably secured to said cylinder members.

6. The device of claim 5 further characterized by means being secured to said shaft and to cylinder to prevent relative rotation beyond ninety (90) degrees.

* * * * *